Dec. 5, 1967   L. I. FEDOROV   3,355,930
METHOD OF, AND DEVICE FOR, MANUFACTURING PROFILE
ARTICLES, PREFERABLY GEARS AND STAR WHEELS
Filed March 8, 1965   3 Sheets-Sheet 1

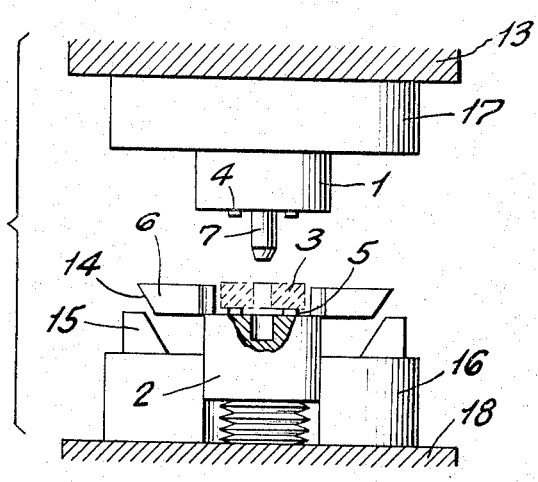
Fig. 6.
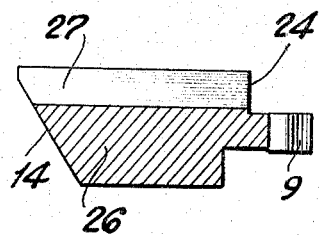
Fig. 10.
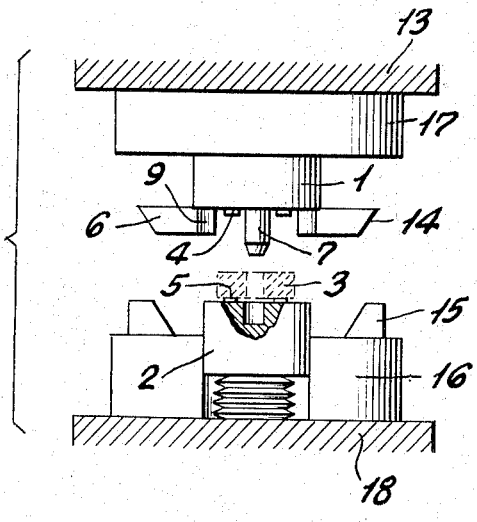
Fig. 7.
Fig. 11.

Dec. 5, 1967    L. I. FEDOROV    3,355,930
METHOD OF, AND DEVICE FOR, MANUFACTURING PROFILE
ARTICLES, PREFERABLY GEARS AND STAR WHEELS
Filed March 8, 1965    3 Sheets-Sheet 3

United States Patent Office 3,355,930
Patented Dec. 5, 1967

3,355,930
METHOD OF, AND DEVICE FOR, MANUFACTURING PROFILE ARTICLES, PREFERABLY GEARS AND STAR WHEELS
Leonid Ivanovich Fedorov, Minsk, U.S.S.R., assignor to Zavod "Gomselmash," Gomel, U.S.S.R.
Filed Mar. 8, 1965, Ser. No. 437,839
6 Claims. (Cl. 72—377)

ABSTRACT OF THE DISCLOSURE

The invention consists of a method and means for finish forming apertured profiled elements such as gears, star wheels and the like, which comprises piercing a central datum hole in a blank with a mandrel, subsequently simultaneously upsetting and pressing this blank radially relative to and while it is on said mandrel by applying active pressing forces in at least three directions thereby providing a multi-directional flow of the metal during stamping and completely finishing the article with a central hole, opposite faces and teeth. From an apparatus aspect two main puncheons are provided and mounted for relative movement toward and away from one another. A mandrel is carried by one of these puncheons, and additional and what could be termed teeth-forming puncheons are mounted for radial movement with respect to the mandrel and are carried by one of the main puncheons so that when they move radially inwards they delimit the axial movement of the puncheons toward one another and thus with the main puncheons and mandrel provide all the necessary pressing forces to cause the metal to flow axially and radially to finish form an article such as a gear.

---

Figure 1:
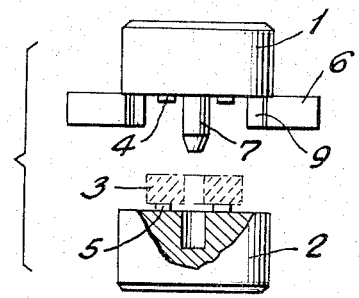

The present invention relates to methods of manufacturing profile articles, preferably gears and star wheels, by mechanical working of a pre-roughed blank with accompanying piercing, upsetting and radial pressing, and to devices for the realization of said methods.

The requirements of modern mechanical engineering as regards the above-mentioned articles are very high, the most important of these requirements being the precision of basic elements of a gear ring and the concentric position of said ring relative to the central hole.

The above-mentioned articles may be manufactured by a method of die stamping, according to which method a blank is subjected to piercing and upsetting, in succession. The formation of the gear ring upon the generatrix of the article, as well as the shaping of its end surfaces, is effected by filling with upset metal the hollow of the die which is shaped accordingly.

A device is known for manufacturing said articles, which device is made as a die with a puncheon provided with a mandrel, the latter forming one end face and the central hole of the article, said device also having a matrix made as a ring whose internal surface is given the negative profile of the outside perimeter of the article (a ring gear). The ring is provided with a bottom of preset profile, which serves to shape the second end face of the article.

The die is split in the plane coinciding with the article end face surface. The puncheon is movable only in the direction of the matrix. The direction of its travel coincides with the direction of the generating surface of the article's toothed profile.

The known method of forming the articles and the kinematic arrangement of the device for the realization of this method possess the following disadvantages.

The known method is not suitable for the manufacture, without drafts, or articles having large dimensions by their generatrix, e.g. considerable width of the gear ring, as an article pressed into a toothed matrix is kept there by the elastic deformation forces, which should be overcome when knocking out the article from the matrix.

Besides that, a rapid wear of the expensive toothed matrix takes place since the matrix is worn out both when it is filled with metal and when the punched article being knocked out slides along the generatrixes of the teeth.

When using the known method, it is difficult to create an intensive flow of metal in the peripheral parts of the blank forming the gear ring, as the pressure is only exerted by the mandrel from the center of the blank and by the puncheon—on its face ends. As the places of application of working pressures are distant from the zone of the most intensive plastic forming of metal and the direction of the instrument travel does not coincide with the direction of the flow of metal to form the profile elements of the article, the filling of relief by the generatrix of the matrix is inhibited and may be achieved only upon boosting up the working efforts.

While employing the known kinematic arrangement, it is impossible to manufacture an article having no radial burr in the plane of the die joint, as the forming of peripheral parts of the article starts long before the complete closure of the die, whereas the flow of metal in the axial direction is not precluded by the puncheon surface.

Apart from the above, the known method is not suitable for manufacturing articles with a strictly concentric position of the gear ring with respect to the central hole, since the mandrel forming the central hole is built in the puncheon and linked with the upper part of the die, and the matrix forming the gear ring is fixed to the lower part of the die. It is difficult to achieve a high degree of accuracy in their relative position, since the two parts of the die are mated with a clearance fit, the clearance value determining the degree of excentricity of the gear ring relative to the central hole.

The above-mentioned disadvantages of the known method of forming profile articles, e.g. gears, make it impossible to use said method for finish-to-size plastic forming of such articles. The known method of forming profile articles belongs in the category of roughing methods, as it only meets the requirements of preliminary operations. The articles manufactured by the known method have burrs on their face end surface and are used as blanks for subsequent operations, such as gear cutting, etc.

At the same time, as proven in practice, the most economical methods in the manufacture of gear-type profile articles are the precision methods of plastic forming, which methods are completely free of the necessity to finish the gear ring by cutting.

This is accounted for by the fact that the presence of forged teeth on a blank seriously complicates the mechanical treatment of the latter, whereas little economy which may be achieved owing to the stamping out of tooth spaces is brought to nothing by complications in the manufacture of gears and by difficulties in the subsequent mechanical finishing of such blanks.

An object of the present invention is to eliminate the above-mentioned disadvantages.

It is a particular object of the present invention to work out a finish-to-size method of plastic forming, i.e. a method that would make it possible to manufacture profile articles, such as gears and star wheels, requiring no additional finishing and characterized by such a degree of surface finish as well as accuracy of profile and basic dimensions, as to be ready for use directly after being stamped.

The above-mentioned and other objects of the present invention may be achieved through the use of a method of manufacturing profile articles, such as gears and star wheels, by piercing, upsetting and radial pressing of a blank, wherein, according to the invention, the process of radial pressing of the blank is carried out simultaneously with upsetting said blank on a mandrel that has pierced it, active forces being applied in several directions, but not less than three, thus providing for the multidirectional flow of metal and finish-to-size forming of the article within one operating cycle.

Also in the accomplishment of the above-mentioned object, the press used in the method of the invention is provided with a die stamping device comprising two main puncheons positioned one opposite the other with a possibility of being drawn together, said puncheons upsetting the blank, and a mandrel mounted on one of said main puncheons, said mandrel designed for piercing the central datum hole in the blank, said die stamping device, according to the invention, being provided with additional puncheons movably mounted in radial guides of one of the main puncheons; said additional puncheons are placed between the main ones whose surfaces overlap the working areas of the additional puncheons, thus insuring the direction of their drawing together.

The additional puncheons are made separable, with a movable (floating) fixing of the working areas, to provide for a reliable fitting of the additional puncheons to the working surfaces of the main puncheons as well as for the absence of burrs on the formed article.

One of the main puncheons serves, at the same time, as a stop limiting the radial drawing together of the additional puncheons.

For this purpose the additional puncheons are provided with projections.

One of the main puncheons with radial guides and additional puncheons mounted therein forms a single unit, i.e. a detachable head of the die stamping device.

When using the proposed die stamping device in presses having no radially driven working organs, the device is provided with a means for radial drawing together of the additional puncheons, said means comprising wedge-shaped stops mounted on the press plate, the working surface of each of said stops interacting with the end face of a corresponding additional puncheon having an inclined surface, one of the main puncheons being made movable in the direction of travel of the working organ of the press under the action of the other main puncheon.

To relieve the head of the stamping device from the pressure of upsetting the blank, one of the main puncheons movable in the direction of travel of the working organ of the press under the action of the other main puncheon, is mounted on a shock absorber, e.g. pneumohydraulic one, which creates, independently of the working organ of the press, a counterpressure force insuring the upsetting of the blank.

Figure 2:
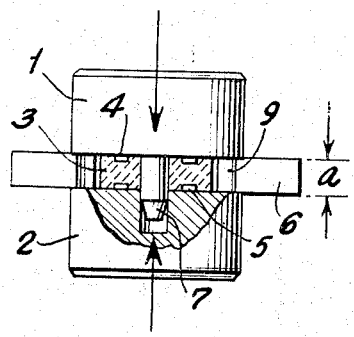
Figure 3:
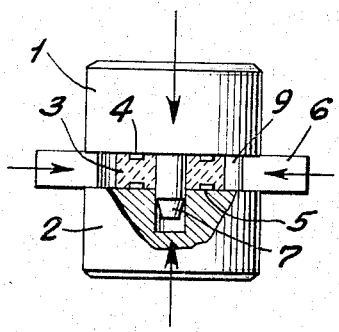
Figure 4:
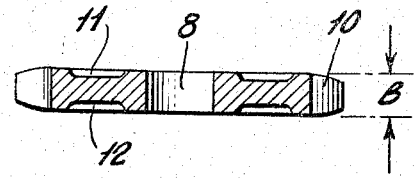
Figure 5:
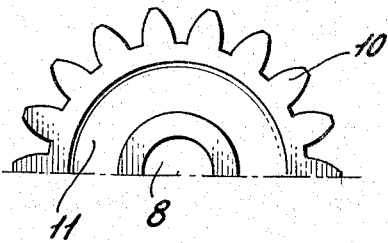
Figure 8:
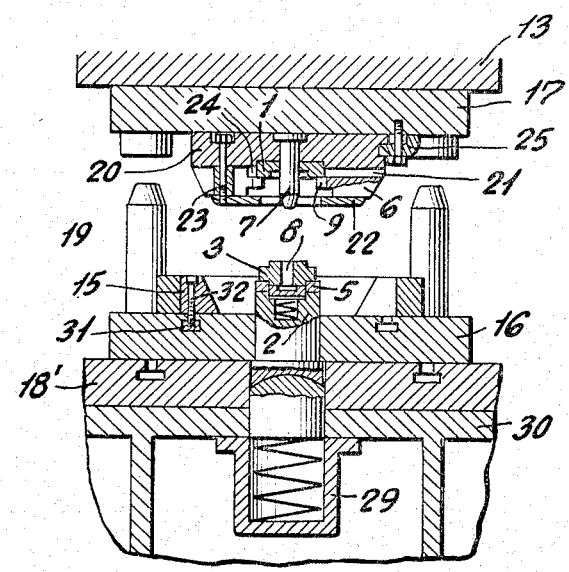
Figure 9:
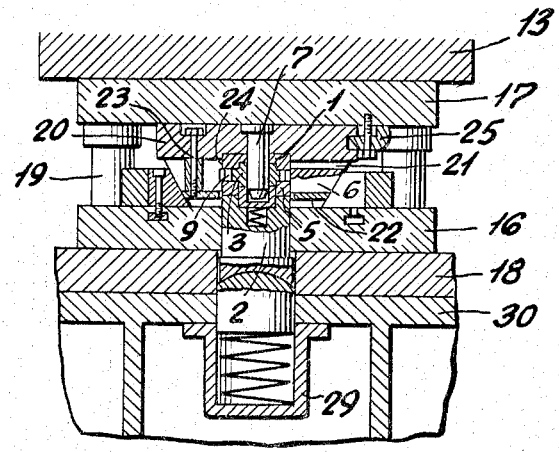

The present invention will further be described in conjunction with the preferred embodiment thereof, reference being had to the accompanying drawings, wherein:

FIG. 1 shows a schematic diagram of the die stamping device in the initial position, with a blank;

FIG. 2, ditto, with the main puncheons being drawn together (piercing and upsetting the blank); arrows indicate the direction of the drawing together of the puncheons, and the direction of the application of forces;

FIG. 3, ditto, with the additional puncheons being drawn together (radial pressing and upsetting the blank);

FIG. 4 is an article manufactured in accordance with the method of the invention (shown in axial section);

FIG. 5, ditto, top view;

FIG. 6 shows a schematic diagram of a die stamping device for presses which have no radially driven working organs; an embodiment in which the additional puncheons are tied into a single unit with the lower main puncheon;

FIG. 7, ditto, an embodiment in which the additional puncheons are tied into a single unit with the upper main puncheon;

FIG. 8, ditto, with a shock absorber for upsetting the blank; the die stamping device is in the initial position (a possible embodiment);

FIG. 9, ditto, at the moment of radial pressing and upsetting the blank;

FIG. 10 shows an additional puncheon, side view (a possible embodiment);

FIG. 11, ditto, top view.

The proposed device for manufacturing profile articles, such as gears, is a die stamping device (FIGS. 1, 2, 3) comprising two main puncheons 1 and 2 which are positioned in one line with a possibility of being drawn together, serve to upset a blank 3 and have a preset configuration of working surfaces 4 and 5, respectively, said working surfaces serving to form the face ends of blank 3.

Additional puncheons 6 are positioned in one plane, radially from the main puncheons 1 and 2 and at right angles to the longitudinal axes of the latter. Puncheons 6 press the blank in radial direction, serving mainly to form its outer surface. In the process of pressing they are drawn together towards the center, traveling in radial guides of one of the main puncheons. The number of the additional puncheons is determined by the number of profiles to be made on the generating surface of the article, e.g. teeth of gears or star wheels.

One of the main puncheons, say, puncheon 1, is provided with mandrel 7 serving to pierce blank 3 and to form the central hole. The shape of mandrel 7 depends upon the shape of the hole, hence the mandrel may be made cylindrical, conical, plain or toothed.

Working surfaces 4 and 5 of main puncheons 1 and 2 completely overlap working areas (tips) 9 of additional puncheons 6 which work deep into blank 3 between main puncheons 1 and 2, and accordingly the zone of the plastic flow of metal.

Surfaces 4 and 5 of main puncheons 1 and 2 serve, at the same time, as guides in the travel of additional puncheons 6. Since the working areas 9 of additional puncheons 6 are made movable (floating) in the direction of drawing together of the main puncheons, said working surfaces 9 fit closely the working surfaces 4 and 5 of main puncheons 1 and 2. This provides for a finish-to-size forming of the gear ring as to the height and precludes the forming of the face and radial burrs.

Blank 3 is manufactured by one of the conventional methods. It may be made with or without a hole. In the former case, the diameter of hole shall be less than the outside diameter of mandrel 7 by the value of allowance for complete filling with metal of profiles made on said mandrel.

During the operation, blank 3 is placed onto working surface 5 of main puncheon 2, after which main puncheons 1 and 2 are drawn together (FIG. 1).

As puncheons 1 and 2 are being drawn together, mandrel 7 works deep into blank 3 piercing in it central hole 8, while main puncheons 1 and 2, upon the contact of their working surfaces 4 and 5 with blank 3, upset the latter (FIG. 2).

The rapprochement of working surfaces 4 and 5 of main puncheons 1 and 2 is limited by the height "a" of the working areas of additional puncheons 6, thus determining the value to which main puncheons 1 and 2 may be drawn together and, consequently, the height "b" of gear ring 10 of the article (FIG. 4).

The closing of the die stamping device is fixed by the contact of working areas 9 of additional puncheons 6 with working surfaces 4 and 5 of main puncheons 1 and 2. After this comes the working stroke of additional puncheons 6 which move, as if along guides, in the gap formed between working surfaces 4 and 5 of main puncheons 1 and 2, and press blank 3 in radial direction (FIG. 3).

The method of processing and the kinematics of the die stamping device provide for the application to blank 3 of three active forces acting from the corresponding movable organs (puncheons 1, 2 and 6) of the die stamping device in several, not less than three, directions. This insures an intensive multi-directional flow of metal and finish-to-size plastic forming of the article elements.

Thus, mandrel 7 working deep into blank 3 causes the flow of metal from the center to periphery, in radial direction and in the direction of face ends of blank 3.

If mandrel 7 has a toothed, e.g. slitted, surface, there are also created necessary conditions for a counterflow of metal, in radial direction from the periphery to center.

When upsetting blank 3 between main puncheons 1 and 2, the metal flows in radial direction both to the periphery and to the center of blank 3.

As a result of squeezing blank 3 from all sides in the process of radial pressing, there are created conditions for the flow of metal both in the direction of face ends 11 and 12 of the article and in radial direction, from the periphery to center and from the center to periphery, i.e. towards main puncheons 1 and 2.

Thus, according to the method of the invention, in the process of deformation of blank 3 by movable puncheons 1, 2 and 6 there forms a multi-directional flow of metal accompanied by the forming of the article profile surfaces, owing to the copying of the profiles of the die stamping device working organs contacting blank 3. Moreover, within one working stroke of the device all surfaces of a complex-profile article, oriented in different directions in space, are formed.

Owing to the fact that additional puncheons 6 forming gear ring 10 of the article are tied into a single unit with mandrel 7 and one of the main puncheons, e.g. puncheon 1, limiting radial working motion of all additional puncheons 6 which, in their turn, limit the drawing together of main puncheons 1 and 2, conditions are provided for the finish-to-size forming of profile surfaces of the article, namely, its gear ring 10, central hole 8 and face end surfaces 11 and 12 (FIGS. 4, 5).

It is most feasible to use as a drive, performing the working motions of the die stamping device working organs, a special press having one main movable organ (slider) and a necessary number of auxiliary sliders, the latter being positioned radially around the main slider and performing motions in directions perpendicular to its longitudinal axis.

It is also possible to use for manufacturing profile articles by the method of the invention standard single-acting presses, i.e. presses having one movable organ. In this case, provision should be made of a means for carrying out the travel of additional puncheons 6, said means providing for the working motion of the additional puncheons for radial pressing as well as for their return to the initial position.

Used as the means providing for a radial drawing together of additional puncheons 6 by transforming the forward motion of slider 13 of the press is an arrangement comprising bevels (inclined surfaces) 14 on the face ends of additional puncheons 6 and wedge stops 15 fixed to plate 16 of the die stamping device, said wedge stops having working surfaces similar to bevels 14 (FIGS. 6, 7).

Additional puncheons 6 may be tied into a single unit—head—either with the lower main puncheon 2 (FIG. 6), or with the upper main puncheon 1 (FIG. 7).

One of the main puncheons, say, puncheon 1, is connected with plate 17 of the die stamping device (FIG. 6), whereas the second main puncheon 2, connected with additional puncheons 6, is spring-mounted and placed in plate 16 with a possibility of moving under the action of the other main puncheon 1 in the direction of its travel. Any of plates 16 and 17 is fixed to slider 13 and, accordingly, to table 18 of the press.

Thus, the above-described means transforms the forward working motion of slider 13 and that of one of the main puncheons, say, puncheon 1 connected with said slider, into the radial motion of additional puncheons 6, at the same time receiving the vertical component force of upsetting the blank 3.

If one of the main puncheons, say, puncheon 2, is mounted on a powerful shock absorber, e.g. pneumohydraulic one, whose pressure upon main puncheon 2 does not depend on the angle of inclination of the working surface of wedge stop 15 and, accordingly, on the effort of slider 13 and is sufficient for upsetting blank 3 in the process of radial pressing the latter, then the counter-pressure created by the shock absorber will completely relieve the head of die stamping device from the upsetting force, whereas the closing of said die stamping device along the working surface of one of the main puncheons will be performed irrespective of the pressure of slider 13 of the press.

Given below is the description of a possible embodiment of the die stamping device of the invention, provided with a means for radial drawing together of the additional puncheons and a powerful shock absorber.

The die stamping device is made as a dieset, with leader pins (FIGS. 8 and 9). The dieset has the upper plate 17 and lower plate 16 connected by pins 19.

The working area of the upper main puncheon 1, which contacts blank 3 in the process of forming the article, is made as a flat round washer of preset configuration providing for the forming of the end faces and profile elements of the hub part of the article. The washer is made of high-alloy steel with a high degree of surface finish and is fixed with screws (not shown in the drawing) to a massive, round in plan, yoke 20 which may be regarded as a continuation of the working surface of main puncheon 1. The end surface of yoke 20 is provided with radial guides 21, additional puncheons 6 being movably mounted in said guides. Disk 22, connected with yoke 20 by means of screws 23 let through gaps between additional puncheons 6, presses the latter to the end surface of yoke 20 and provides for the assembly of the above-listed elements into a single unit—the head of the die stamping device.

Fixed in the central hole of yoke 20 is mandrel 7 having a cylindrical working area and conical front part. Since mandrel 7 is an overloaded element of the die stamping device, it is made of high-alloy tool steel of a hard alloy.

The upper main puncheon 1 fixed in respect to yoke 20 and mandrel 7 serves, at the same time, as a stop limiting the radial travel of additional puncheons 6 when the latter work into blank 3. This is achieved by means of projections 24 made on additional puncheons 6, said projections pressing against the generating surface of main puncheon 1.

The rigid mounting on one base of mandrel 7 and main puncheon 1, the latter serving as a stop limiting the radial drawing together of additional puncheons 6, insures a concentric position in the article of gear ring 10 relative to central hole 8 (FIGS. 4 and 5).

In the process of forming, metal is pressed by puncheons 6 moving from all sides into blank 3, and mandrel 7 becomes bound with metal. For this occasion, provision is made of a powerful stripper (not shown in the drawing) actuated by the pusher (not shown in the drawing) during the back (upward) stroke of slider 13 after its working stroke (FIG. 9).

The upper main puncheon 1, mandrel 7, additional puncheons 6 and the stripper, all assembled on yoke 20 and bound by means of disk 22, comprise a single unit—the head of die stamping device—fixed to the upper plate 17 of the die stamping device with the help of swivel clamps 25. Such a design of the head of die stamping device makes for its easy and quick removal and mounting.

When die stamping, the greatest load is suffered by additional puncheons 6 and, most of all, their working areas (tips) 9 which work deep into metal. To bring down the cost, easily worn-out tips 9 of additional puncheons 6 are made detachable, of a minimum size and simple shape (FIGS. 10 and 11). Besides that, additional puncheons 6 are provided with carriers 26 made as bars with a cross section gradually increasing starting at the tip. Carriers 26 have flat bearing surfaces touching the yoke 20 and disk 22 of the head of die stamping device, and guides 27 for radial travel in yoke 20 in conjugation with guides 21 of said yoke (FIGS. 8 and 9).

Tip 9 is fixed in the groove of carrier 26 by means of screw 28 pressing the end of tip 9 to the bearing surface of carrier 26. Screw 28 provides for the mobility (floating) of tip 9 in the vertical direction, which enables the latter, when worked deep into blank 3, to fit closely working surfaces 4 and 5 of the upper and lower puncheons 1 and 2, and to preclude the flow of metal along the planes of closing the die stamping device, thus making it possible to obtain an article free of burrs.

Blank 3 is placed on the lower main puncheon 2 and set up either to the outside diameter of the blank hub, or to central hole 8.

The lower main puncheon 2 is movably mounted in the lower plate 16 of the die stamping device and is made separable. Its working surface 5 made as a flat washer with a pre-shaped recess for forming the hub and lower face end of the article is manufactured of high-alloy tool steel and fixed to main puncheon 2 by means of screws (not shown in the drawing).

Design pecularities of the die stamping device of the invention make it possible to use it in standard single-acting presses.

The die stamping device of the invention (FIGS. 8 and 9) is used, for instance, in a press having only one movable organ—slider 13.

To transform the vertical motion of slider 13 into radial motions of additional puncheons 6, use is made of a means comprising bevels (inclined surfaces) made on the back ends of additional puncheons 6 at an angle of 30°, and wedge stops 15 whose working surfaces are similar to bevels 14.

One of the main puncheons, e.g. puncheon 2, is made movable in the direction of travel of slider 13; this puncheon 2 goes downwards under the action of main puncheon 1, thus making it possible for the slider to lower in the process of forming the article and to insure the operation of the means which moves additional puncheons 6 in radial directions.

The effort, necessary for upsetting the blank 3 and for pressing additional puncheons 6 against working surfaces 4 and 5 of main puncheons 1 and 2 when the additional puncheons work into blank 3 (the die locking effort), is created by shock absorber 29, e.g. pneumohydraulic one, placed under plate 18' in table 30 of the press.

With the help of a similar means serving to transform the vertical motion of slider 13 into horizontal motions of additional puncheons 6, it is possible to use for creating the force of upseting the blank instead of shock absorber 29 the vertical component force received by bevels 14 of additional puncheons 6. In this case, there is no need for shock absorber 29, but the head of die stamping device will bear tensile stresses equal to the force of upsetting the blank.

The article may be formed by both cold and hot stamping. In the case of hot stamping, provision is made in the die design of a system of water cooling of parts which come in contact with hot metal. Provision is also made of a continuous lubrication of movable elements of the die stamping device with the help of the main lubrication system of the press.

The design and general composition of the die stamping device of the invention provide for the reliability and long service life of all parts and elements thereof.

The position of the most important unit, i.e. the head having movable elements, in the upper part of the die stamping device makes it possible to reduce the time of contact of puncheons and other organs of the die with the article, this possibility being of special importance when hot stamping. This fact reduces the possibility of clogging the guides of the die movable elements.

By keeping radial guides 21, serving for the travel of additional puncheons 6, away from the zone of forming and by positioning them somewhat above the working surface 4 of main puncheon 1 and, consequently, above the upper face end of the article being formed, said guides are removed the zone of high stresses, heat loading and the source of clogging, which makes it possible to have a permanent layer of lubricant on said radial guides of additional puncheons 6 and, in fact, to provide for a precisely directed travel of additional puncheons 6.

The die stamping device of the invention is universal, with a possibility of using one and the same dieset, slightly readjusted, for stamping a wide range of articles. This is achieved by introducing into the design of a dieset of certain elements, the variation of which makes for an easy readjustment of the die. These are:

(a) The head of die stamping device is fixed to plate 17 by means of swivel clamps 25 providing for a quick (in the course of several minutes) removal of said head from the press with a subsequent mounting of another head having, for instance, a different number of additional puncheons 6;

(b) Stops 15 are fixed by means of movable thrust bearings 31 and screws 32 providing for a possibility of resetting said stops 15, depending on the number of puncheons 6 in the head of die stamping device (FIG. 8).

The advantage of the proposed method of manufacturing profile articles and the die stamping device for the realization of said method lies in the possibility of automating the process and combining the process of forming with other operations.

By employing an isochronous treatment of the blank, heating the blank outside the die stamping device, by avoiding the necessity of accurate fixing and fastening the blank before stamping as well as by automating the process of feeding the blanks to the die stamping device and of removing the ready articles therefrom one may achieve a degree of efficiency practically equal to the number of working strokes of the press, i.e. from 20 to 50 articles per minute.

High rate of forming provides for the losses of heat accumulated by the blank when heated being insignificant, thus making it possible to combine the process of forming the article with the thermal treatment of the latter. Therefore, the article is subjected to hardening directly after forming, thus insuring the thermomechanical treatment of metal.

As a result of the plastic deformation of metal, the physicomechanical properties of the latter improve considerably. Forged elements of profile articles, such as teeth of gears or star wheels, have a hardened surface; their static and dynamic breaking loads increase by 20 percent, while their resistance to wear is 1.3 to 1.4 times higher than that of teeth produced by cutting.

Another advantage of the method of the invention is that it is possible to use in the process of forming blanks with low degree of precision, such as cast and stamped ones, and, nevertheless, to manufacture articles with high degree of precision.

Technical and economic effect achieved, when using the method of the invention for manufacturing chain gears, proved to be quite significant. Thus, the operating efficiency (when forming gear rings) increased 30 times. The economy of metal was 20 percent. One press provided with the die stamping device of the invention replaced about 30 gear-cutting machines and saved about 600 sq. m. (about 6,500 sq. ft.) of effective area.

I claim:

1. A method of finish manufacturing apertured profiled articles, such as gears and star wheels, comprising piercing a central datum hole in a blank with a mandrel, subsequently simultaneously upsetting and pressing said blank in the radial direction relative to and while it is on said mandrel by applying active pressing forces in at least three directions simultaneously thereby providing for a multidirectional flow of metal and finish-to-size forming of such article having a central hole, opposite side surfaces and teeth.

2. A die stamping device for a press for manufacturing apertured profiled articles such as gears and star wheels, by piercing the central datum hole in a rough blank, with subsequent isochronous upsetting and radial pressing of the latter, said die stamping device comprising: two main puncheons positioned one opposite the other mounted for relative movement toward and away from one another, said puncheons when relatively moved together upsetting a blank; a mandrel mounted on one of said main puncheons, said mandrel piercing the central datum hole in such a blank; radial guides carried by one of said main puncheons, additional puncheons movably mounted in said radial guides, said additional puncheons being placed between said main puncheons whose surfaces overlap the working areas of the additional puncheons, thus delimiting the direction of the drawing together of the latter.

3. A die stamping device of a press as claimed in claim 2 and said additional puncheons being individual elements having a movable fixing of their working areas in the direction of the drawing together of the main puncheons, to provide for a reliable fitting of said additional puncheons to the working surfaces of said main puncheons as well as for the absence of burrs on ready articles.

4. A die stamping device of a press as claimed in claim 2 and one of said main puncheons constituting a stop limiting the radial drawing together of said additional puncheons which are provided with projections serving the same purpose.

5. A die stamping device of a press as claimed in claim 2 and one of said main puncheons constituting with said radial guides and with said additional puncheons mounted in the latter, a single detachable head of said die stamping device.

6. A die stamping device as claimed in claim 2, and shock absorbing means for relieving one of said main puncheons from the pressure engendered in upsetting the blank and creating independently of relative movement of the puncheons toward one another a counter pressure ensuring proper upsetting of the blank.

References Cited
UNITED STATES PATENTS

| | | | |
|---|---|---|---|
| 874,448 | 12/1907 | Smith | 29—159.2 |
| 1,428,219 | 9/1922 | Crawford | 72—401 |

LEONIDAS VLACHOS, *Primary Examiner*.